United States Patent [19]

De Leur

[11] Patent Number: 4,881,475

[45] Date of Patent: Nov. 21, 1989

[54] METHOD FOR CLEANING UP CONTAMINATED SOIL

[75] Inventor: Laurens C. De Leur, Rijnsburg, Netherlands

[73] Assignee: B.V. Aannemingsbedriof N.B.M., The Hague, Netherlands

[21] Appl. No.: 172,373

[22] Filed: Mar. 24, 1988

[30] Foreign Application Priority Data

Mar. 27, 1987 [NL] Netherlands ................. 8700726

[51] Int. Cl.$^4$ ............................................. F23G 5/00
[52] U.S. Cl. ........................................ 110/346; 110/226; 110/236; 110/246; 241/DIG. 10
[58] Field of Search ............ 110/236, 346, 226, 246; 241/DIG. 10

[56] References Cited

U.S. PATENT DOCUMENTS

| | | | |
|---|---|---|---|
| 4,141,373 | 2/1979 | Kartanson et al. | 110/236 X |
| 4,487,372 | 12/1984 | Deve | 110/236 X |
| 4,667,609 | 5/1987 | Hardison et al. | 110/236 |
| 4,700,638 | 10/1987 | Przewalski | 110/236 X |
| 4,750,436 | 6/1988 | Maury et al. | 110/236 X |

FOREIGN PATENT DOCUMENTS

| | | |
|---|---|---|
| 0155022 | 9/1985 | European Pat. Off. . |
| 3216771A1 | 12/1982 | Fed. Rep. of Germany . |
| 3447079A1 | 3/1986 | Fed. Rep. of Germany . |
| 7732818 | 10/1977 | France . |

OTHER PUBLICATIONS

Grondreiniging, N.B.M. Bodemsanering B.V., Den Haag, NL; "Thermisch ontleden van bobemverontreiniging tot A-waarden"*In zinjn geheel*6-87.

Primary Examiner—Edward G. Favors
Attorney, Agent, or Firm—Harness, Dickey & Pierce

[57] ABSTRACT

The invention is a method for cleaning up contaminated soil containing not only different types of hydrocarbons but also heavy metals and cyanades which upon heating of the soil can form dioxin and benzofuran products. According to the invention the production of said products is prevented by keeping the wall temperature of the rotating furnace at a high level such that its temperature during the entire process is higher than the temperature of spontaneous combustion of the pyrolyses products of which at least the hydrocarbons bind the oxygen in the furnace. The oxygen content may be further influenced by the infeed of an inert gas and/or by adding an organic fraction such as humus.

6 Claims, No Drawings

METHOD FOR CLEANING UP CONTAMINATED SOIL

The invention relates to a method for cleaning up contaminated soil exclusively by means of indirect heating of the soil in a rotating furnace which is sealed with respect to the environment, the contaminants released from the soil in said furnace being combusted in a second furnace at an appreciably higher temperature.

Such a method is known and is used in a test system recently developed and constructed by the Applicant. There is a brochure in existence on said known method and device which is entitled "CLEANING UP SOIL, Thermal decomposition of soil contaminant to A values".

In the known method, the wall of the rotating furnace is heated to a temperature of 300° to 600° C. as are also the contaminants released under these conditions.

In addition to aliphatic and aromatic hydrocarbons, polycyclic aromatic hydrocarbons and volatile and nonvolatile halogenated hydrocarbons, contaminated soil often contains heavy metals and cyanides as well. The sites of former gasworks often contain cyanide-containing compounds as well as aromatic hydrocarbons. When cyanide-containing soil is heated, hydrocyanic gas may form. At temperatures of 1100° C. and over, this can be converted with oxygen into $CO_2$, $H_2O$ and $N_2$.

When the known method is used, the problem then arises that during removal of the contaminants from the furnace and into the gas pipes to the post burner, dioxin and benzofuran products may be produced, which is undesirable.

In addition, as a result of the gases and vapours released, the concentration in the oxygen-containing environment in the furnace may become so high that the explosion limit may be exceeded.

The penetration of air and, consequently, of oxygen cannot be prevented. Even if seals are used at the inlet and outlet of the furnace, air nevertheless always leaks inwards with the incoming soil and via the outgoing soil.

The object of the invention is therefore to provide a method in which these drawbacks are eliminated.

According to the invention said object is achieved in that, during the complete treatment process, the wall temperature of the furnace is kept above the spontaneous combustion temperature of the pyrolysis products which are released from the soil, and said temperature is kept so high that at least the hydrocarbons released react with the oxygen present in the furnace and remove said oxygen.

This then has the surprising effect that the probability of the formation of dioxin and benzofuran prodis reduced to zero and the risk of explosion has been eliminated.

The combustible components such as hydrogen, carbon monoxide, methane and other gases and vapours which are released from the soil during the heating should there fore in fact be present to such an extent that the small quantities of oxygen leaking in are completely bound.

By increasing the wall temperature of the rotating furnace to, a temperature of over 600° C., for example, it is ensured that the contaminated soil to be treated attains a temperature which is above the spontaneous combustion temperature of, for example, 550° C. of the pyrolysis products and at which the oxygen combines with the pyrolysis products present.

The oxygen content can be influenced by feeding an inert gas into the furnace and adding an organic fraction to the soil to be treated so that sufficient pyrolysis products are produced to bind the oxygen. This can be achieved in a simple manner by adding, for example, humus to the soil.

The surprising effect of the measure according to the invention is however, that explosion is prevented because the oxygen combines with the pyrolysis products and that, as a result of this, the risk of formation of dioxin or benzofuran products upstream of the post burner is reduced to zero.

The formation of dioxin and benzofuran products requires oxygen to form the bridge between the benzene rings.

Attention is drawn to the fact that it is known per se, for example from FR-A-2,369,505, that contaminated soil is treated in a rotating furnace by using direct heating, with incomplete combustion of the gases and vapours released, which gases and vapours are then fed to another furnace, such as a cement furnace, for further combustion and influencing the process in the furnace. In this case, pyrolysis may take place at a temperature of the order of 700° C. Said publication does not, however, teach the prevention of the formation of dioxin and benzofuran products by removing the oxygen present by reaction by means of the hydrocarbons released.

The combustion products which are formed during post-combustion according to the method of said FR-A-2,369,505 are used, inter alia, for influencing the product to be produced in the post-combustion furnace such as cement.

It is further known from DE-A-3,216,771, which corresponds to NL-A 8105677, that soil is cleaned up by heating to a temperature of 200° to 400° C. in a rotating furnace after which the gases and vapours released are fed to a post burner. In this case the temperature is lower. The heating may, however, be indirect, direct or a combination of the two. To prevent a danger of explosion, it is known that in this case clean soil is added to the contaminated soil.

That is not, however, an organic fraction, does not bind any oxygen but serves only to dilute.

EXAMPLES

1. Sand contaminated with cyanides, polycyclic aromatic compounds (PCA's) and oil components.

| Starting points: | |
|---|---|
| input to rotating furnace | 10 tonnes of dry soil/hour |
| moisture content | 1% |
| contaminants: | |
| cyanides | 100 mg/kg of DM |
| | (DM = dry matter) |
| PCA's | 200 mg/kg of DM |
| oil | 1000 mg/kg of DM |
| furnace wall temperature: | |
| 1/3 length | 800° C. |
| 1/3 length | 750° C. |
| 1/3 length | 725° C. |
| final temperature of soil | 600° C. |
| final concentration of contaminants: | |
| cyanides less than | 5 mg/kg of DM |
| PCA's less than | 1 mg/kg of DM |
| oil less than | 100 mg/kg of DM |
| inleakage of oxygen 100 norm. m³/hour. | |

This may be more or less dependent on the sealing provided

-continued

| Starting points: |
|---|
| by the soil. |

The gas composition without an organic fraction added will be as follows:

|  |  |  | volume fraction |
|---|---|---|---|
| (1) contaminants: |  |  |  |
| cyanides | 0.95 kg/hour | 0.8 norm. m³/hour | 0.3% |
| PCA's | 2 kg/hour | 0.3 norm. m³/hour | 0.1% |
| oil | 9 kg/hour | 1.3 norm. m³/hour | 0.5% |
| (2) moisture | 100 kg/hour | 125 norm. m³/hour | 50.5% |
| (3) nitrogen introduced |  | 20 norm. m³/hour | 8.1% |
| (4) inleakage of air |  | 100 norm. m³/hour | 40.4% |
| oxygen content thereof |  | 20 norm. m³/hour | 8.1% |

The explosion limit of combustible components is approx. 0.75% volume fraction at 600° C. The minimum limit of oxygen at which no explosion occurs is 2 to 4% volume fraction. From this calculation it is evident that without measures being taken, explosion may occur.

On adding 4% organic fraction in the form of humus, the following gaseous pyrolysis products will be formed:

| water |  | 100 norm. m³/hour |
|---|---|---|
| carbon dioxide | approx. | 30 norm. m³/hour |
| carbon monoxide | approx. | 25 norm. m³/hour |
| hydrogen | approx. | 10 norm. m³/hour |
| methane | approx. | 15 norm. m³/hour |
| ethane | approx. | 3 norm. m³/hour |
| hydrocarbons molecular weight 100 | approx. | 20 norm. m³/hour |

At temperatures above the spontaneous combustion limit, the 20 norm. m³ of oxygen will react spontaneously with the combustible components. Said quantity of oxygen will be able to react with 3.6 norm. m³ of hydrogen and/or 7.1 norm. m³ of methane and/or 50 norm. m³ of carbon monoxide and/or 7.6 norm. m³ ethane.

Said quantity of oxygen will be completely bound to the combustible pyrolysis components.

II. Clay/peat contaminated with polycyclic aromatics and oil components.

| Starting points: |  |
|---|---|
| input to furnace | 10 tonnes of dry soil/hour |
| moisture content | 2% |
| contaminants |  |
| PCA's 500 mg/kg of DM |  |
| oil | 1000 mg/kg of DM |
| organic fraction | 10% |
| tube wall temperature |  |
| 1/3 length | 800° C. |
| 1/3 length | 750° C. |
| 1/3 length | 725° C. |
| final temperature of soil | 600° C. |
| final concentration of contaminants |  |
| PCA's | less than 1 mg/kg of DM |
| oil | less than 100 mg/kg of DM |
| inleakage of oxygen | 100 norm. m³/hour. |
| This may be higher or lower, depending on the sealing provided by the soil. |  |

The gas composition without chemical reaction with the oxygen will be:

|  | load kg/hour | volume norm. m³/hour | volume fraction % |
|---|---|---|---|
| (1) contaminants |  |  |  |
| PCA's | 5 | 0.8 | 0.08 |
| oil | 9 | 1.3 | 0.1 |
| (2) pyrolysis products |  |  |  |
| water | approx. | 250 | 28 |
| carbon dioxide | approx. | 80 | 9.1 |
| carbon monoxide | approx. | 65 | 7.4 |
| hydrogen | approx. | 25 | 2.8 |
| methane | approx. | 35 | 4.0 |
| ethane | approx. | 5 | 0.6 |
| hydrocarbons molecular weight = 100 | approx. | 50 | 5.7 |
| (3) moisture | 200 | 250 | 28.3 |
| (4) nitrogen added |  | 20 | 2.3 |
| (5) inleakage of air |  | 100 | 11.3 |
| oxygen herein |  | 20 | 2.3 |

The explosion limit of combustible components is approx. 0.75% volume fraction. The minimum limit of oxygen at which no explosion occurs is 2 to 4% volume fraction.

From this calculation it is evident that, without spontaneous combustion, explosion may occur in the event of inleakage of air. By keeping the temperature of the wall and the soil above 550° C., spontaneous combustion with the incoming oxygen will occur and it will be removed by reaction with the combustible pyrolysis products present.

These examples show that the inleakage of air can be removed by reaction with the pyrolysis products of the organic fraction.

Because the oxygen is then removed, or virtually removed, the chance of dioxin or benzofuran products being formed is negligible.

Should any of said product be present, the post-combustion furnace will in fact provide for them to be rendered harmless.

Without the measures according to the invention there is, however, danger of explosion and the post-combustion furnace cannot deal with the quantity of toxic dioxin and benzofuran products formed so that a considerable part thereof enters into the atmosphere. The invention therefore solves this problem.

I claim:

1. Method for cleaning up contaminated soil by means of indirect heating of the soil in a rotating furnace which is sealed with respect to the environment, contaminants released from the soil in said rotating furnace being subsequently combusted in a second furnace at an appreciably higher temperature than the wall temperature of said rotating furnace, the method comprising:
maintaining said wall temperature of said rotating furnace above the spontaneous combustion temperature of pyrolysis products which are released from the soil and maintaining said wall temperature sufficiently high to react hydrocarbons released as said pyrolysis products form the soil in said rotating furnace with any oxygen present in said rotating furnace and thereby remove said oxygen from said rotating furnace.

2. Method according to claim 1 further comprising feeding an inert gas into said rotating furnace to influence the oxygen content in said rotating furnace.

3. Method according to claim 1 further comprising adding an organic fraction to the soil to be treated in the rotating furnace to increase the quantity of said pyrolysis products available to bind the oxygen.

4. Method according to claim 3, wherein the organic fraction consists of humus.

5. Method according to claim 2 further comprising adding an organic fraction to the soil to be treated in the rotating furnace to increase the quality of said pyrolysis products available to bind the oxygen.

6. Method according to claim 5, wherein the organic fraction consists of humus.

* * * * *